United States Patent [19]
McKinzie et al.

[11] 4,181,754
[45] Jan. 1, 1980

[54] IN SITU METHOD OF PREPARING MODIFIED TITANIUM DIOXIDE PHOTOACTIVE ELECTRODES

[75] Inventors: Howard McKinzie, Framingham; Elizabeth A. Trickett, Acton, both of Mass.

[73] Assignee: GTE Laboratories Incorporated, Waltham, Mass.

[21] Appl. No.: 918,002

[22] Filed: Jun. 22, 1978

[51] Int. Cl.$^2$ .................. C25B 11/04; C25B 11/10
[52] U.S. Cl. ............................. 427/74; 427/126; 427/376 C; 427/377; 429/111
[58] Field of Search ............ 427/111, 74, 126, 376 C, 427/377; 204/290 F

[56] References Cited

U.S. PATENT DOCUMENTS

| | | | |
|---|---|---|---|
| 3,259,558 | 7/1966 | Hagiwara | 148/6.3 |
| 3,681,133 | 8/1972 | Dantro | 427/74 |
| 3,948,751 | 4/1976 | Bianchi | 204/290 F |
| 3,975,557 | 8/1976 | Kuchek | 204/290 F |
| 4,003,817 | 1/1977 | Bianchi | 204/290 F |
| 4,025,669 | 5/1977 | Greenstein | 427/123 |
| 4,040,918 | 8/1977 | Johnson | 204/290 F |
| 4,070,504 | 1/1978 | Bianchi | 204/290 F |
| 4,086,157 | 4/1978 | Koziol | 204/290 F |

OTHER PUBLICATIONS

Augustynski, *J. Electrochemical Soc.*, vol. 124, No. 7 (7-1977) *Novel . . . Water* pp. 1063-1064.
Kennedy, *J. Electrochem. Soc.* vol. 125 (5-1978) No. 5, *Photooxidation . . . Electrodes*, pp. 709-714.
Kennedy, *J. Electrochem. Soc.*, vol. 125, No. 5 (5-1978) *Flatband . . . Plot*, pp. 723-726.
Haneman, *J. Electrochemical Soc.* vol. 124, No. 6 (6-1977) *Electrochemical . . . Fe$_2$O$_3$* pp. 861-862.

*Primary Examiner*—Michael F. Esposito
*Attorney, Agent, or Firm*—Jerry F. Janssen

[57] ABSTRACT

A method of preparing doped or modified polycrystalline p- or n-type titanium dioxide semiconductor electrodes utilizable in photoassisted oxidation reactions or photoelectrochemical cells is provided. The method comprises the steps of (1) applying to a titanium substrate a thin film of one or more oxide of metals selected from the group consisting of aluminum and the d-electron transition metals other than titanium, and (2) heating the coated titanium body in an oxygen-containing atmosphere at an elevated temperature, preferably below about 800° C., to sinter the coating to the titanium substrate. The sintering step produces on the titanium substrate a thin photoactive film of titanium dioxide containing a uniform concentration gradient of the previously-applied modifying oxide.

5 Claims, No Drawings

IN SITU METHOD OF PREPARING MODIFIED TITANIUM DIOXIDE PHOTOACTIVE ELECTRODES

CROSS-REFERENCE TO RELATED APPLICATIONS

This application contains subject matter related to subject matter disclosed in the following copending applications, all of which are filed concurrently herewith and assigned to the assignee of the present application.

Application Ser. No. 918,000 filed June 22, 1978 in the names of Howard McKinzie and Elizabeth A. Trickett entitled "An Improved $TiO_2$ Electrode for Photoelectrolysis."

Application Ser. No. 918,018 filed June 22, 1978 in the names of Howard McKinzie and Elizabeth A. Trickett entitled "Modified Titanium Dioxide Photoactive Electrodes."

Application Ser. No. 918,017 filed June 22, 1978 in the name of Elizabeth A. Trickett entitled "Method of Preparing Photoactive $TiO_2$-Coated Thin Film Electrodes."

Application Ser. No. 918,001 filed June 22, 1978 in the names of Howard McKinzie and Elizabeth A. Trickett entitled "Method of Preparing Modified Titanium Dioxide Photoactive Electrodes."

BACKGROUND OF THE INVENTION

This invention relates to photoactive semiconductor electrodes. More particularly, it is concerned with a method of preparing doped or modified polycrystalline p- or n-type titanium dioxide semiconductor photoactive electrodes.

There has been considerable recent interest in the application of photoactive semiconductor electrodes to the electrolysis of water and to the direct conversion of solar to electrical or chemical energy. The uses of such electrodes have recently been generalized to reduction-oxidation reactions in addition to the electrolysis of water. Oxidation reactions at n-type photoactive semiconductor electrodes and reduction reactions at p-type electrodes can be carried out at potentials much lower than ordinarily required using light as the driving force for the reactions. Such processes have been termed "photoassisted" rather than photocatalyzed reactions.

Electrodes fabricated from single crystals of titanium dioxide or doped single crystals of titanium dioxide have been known for some time. Polycrystalline titanium dioxide electrodes produced by chemical vapor deposition techniques or plasma spray methods are also known to the art.

The technique of producing single crystal photoactive $TiO_2$ electrodes is described, for example, by S. N. Frank et al. in "Semiconductor Electrodes 11. Electrochemistry at n-Type $TiO_2$ Electrodes in Acetonitrile Solutions," J. Am. Chem. Soc., 97:7427 (1975). Polycrystalline titanium dioxide electrodes produced by chemical vapor deposition techniques are treated by K. L. Hardee et al. in "The Chemical Vapor Deposition and Application of Polycrystalline n-Type Titanium Dioxide Electrodes to the Photosensitized Electrolysis of Water," J. Electrochem. Soc., 122:739 (1975).

Titanium dioxide normally has high electrical resistivity. To form electrically conductive, semiconductor material the titanium dioxide is typically treated by reduction with hydrogen. It is theorized that such treatment produces a material with oxygen lattice deficiencies in the titanium dioxide crystal with the lattice defect sites contributing to the semiconductor properties. This partially reduced material can be characterized by the general formula $TiO_{(2-x)}$, where x takes on a value between zero and one. These partially reduced phases of titanium dioxide are called Magneli phases of $TiO_2$.

Because of the great possibilities which these electrodes have for the conversion of light to electrical or chemical energy, a number of studies have been directed to methods of fabricating electrodes which make such conversions more efficient. In previously described uses of n-type titanium dioxide semiconductor electrodes, it has generally been the practice to use electrodes formed of single crystals of $TiO_2$ or of polycrystalline $TiO_2$ reduced to the Magneli phases.

Single crystal $TiO_2$ electrodes or doped single crystal $TiO_2$ electrodes are often costly and difficult to produce. On the other hand, polycrystalline electrodes which utilize Magneli phase $TiO_2$ as the photoactive semiconductor material are less difficult and costly to produce, but are limited in their spectral response to wavelengths of light shorter than about 450 nanometers.

It is therefore an object of the present invention to provide a simple and improved method of fabricating modified polycrystalline photoactive semiconductor electrodes utilizable in photoelectrochemical cells and electrochemical oxidation-reduction reactions which are photoactive at wavelengths longer than about 450 nanometers.

BRIEF SUMMARY OF THE INVENTION

Photoactive polycrystalline doped or modified p- or n-type titanium dioxide electrodes utilizable in photoassisted oxidation reactions or in photoelectrochemical cells are fabricated by the method according to the present invention which comprises the steps of (1) providing a suspension of finely divided electrode coating material in a volatile solvent wherein the material comprises at least one oxide of metals selected from the group consisting of aluminum and the d-electron transition metals other than titanium, and (2) applying the suspension of electrode coating material to the surface of a titanium metal body to form a thin film of the electrode coating material thereon, and (3) heating the coated titanium metal body in an oxygen-containing atmosphere at a temperature below 800° C. for a period of time sufficient to form a layer of titanium dioxide on the surface of the titanium body.

The heating step serves to sinter the electrode coating material to the titanium body as well as form a layer of titanium dioxide on the titanium body surface. Interdiffusion of the applied metal oxide and the titanium dioxide layer during the heating step results in the formation of a polycrystalline titanium dioxide film which contains a concentration gradient of the doping or modifying metal oxide having a minimum at or near the titanium body surface and a maximum at or near the film surface.

DETAILED DESCRIPTION

Photoactive semiconductor electrodes are fabricated according to the method of the present invention by incorporating into the titanium dioxide at least one oxide of a metal selected from the group consisting of aluminum and d-electron transition metals other than titanium. (As used throughout this specification and claims, the term "d-electron transition metal" means any metallic element of families 1b, 2b, 3b, 4b, 5b, 6b, 7b or 8 of the Periodic Table of the Elements as it appears on page B-3 of the 53rd Edition of the *Handbook of Chemistry and Physics,* Chemical Rubber Publishing Co., Cleveland, Ohio, 1972, including lanthanum and actinium, but excluding elements of the so-called "inner transition" lanthanide and actinide series.)

The incorporation of the doping or modifying oxide is accomplished by the method of the present invention by first applying a slurry of the oxide to the surface of a titanium metal body and then heating the coated titanium body in an oxygen-containing atmosphere to sinter the coating to the titanium. This heating step, carried out at a temperature below 800° C. but preferably in the range from about 500° C. to about 800° C., also forms a thin layer of titanium dioxide on the surface of the titanium body. During the heating step, interpenetration or interdiffusion of the growing titanium dioxide film and the previously-applied transition metal oxide film occurs. There results on the titanium metal body a film of strongly adherent titanium dioxide having a uniform concentration gradient of the doping or modifying oxide with a concentration minimum at or near the metal body surface, and a maximum at or near the oxide film surface. Incorporation of the oxide modifier into the titanium dioxide crystal lattice is believed to be enhanced in the heating or sintering step. To the extent that such incorporation occurs, such incorporation may be substitutional or interstitial. If the metal ions of the oxide modifier so incorporated are in a chemical oxidation state other than +4, one or more of the surrounding titanium ions must assume an oxidation state other than its normal +4 state in the crystal lattice in order to preserve electrical charge neutrality. This adjustment of charge within the crystal results in lattice defect sites which provide the p- or n-type semiconductor activity. In electrodes fabricated without an oxide modifier it is necessary to produce such lattice defects by reduction of the titanium dioxide with hydrogen or some other reducing gas. Such a reduction step is not required in the method according to the present invention although it may be used to further enhance the internal electrical conductivity of the electrodes so fabricated.

Dopant or modifier materials which have been found to be effective in producing photoactive, p- or n-type semiconductor titanium dioxide electrodes according to the method of the present invention possess some solid state solubility in titanium dioxide, and an impurity electronic energy level band lying within the energy band gap of titanium dioxide. Oxides of metals selected from the group consisting of aluminum and the d-electron transition metals other than titanium in which oxides the metal is in a chemical oxidation state other than +4 have been found to be effective. Tungstic oxide has been found to be the preferred material for incorporation into $TiO_2$ photoelectrodes using the fabrication method of the instant invention.

To prepare photoactive electrodes by the method of the present invention, the doping or modifying oxide is taken up in sufficient volatile solvent to form a slurry of a consistency which is easily painted. The volatile solvent can be water, any low molecular weight ketone, alcohol, ester, or mixtures thereof. The proportions of volatile solvent and dry powdered oxide mixture are not critical, however a mixture of an easily spread consistency must be obtained. The resulting slurry or suspension is applied to the surface of a titanium metal body using the techniques of painting, flow coating, dipping, etc. Following application of the electrode coating suspension to the metal body, the coated metal body is allowed to dry in air. The dried coated metal body is then heated in an oxygen-containing atmosphere at a temperature of from about 500° C. to about 800° C. for a period of from one-quarter hour to eight hours in order to sinter the electrode coating to the metal body. The oxygen-containing atmosphere may be pure oxygen or air. The heating time required for sintering and oxidation of the titanium body varies indirectly with the partial pressure of oxygen in the heating atmosphere.

To enable one skilled in the art to practice the present invention, the following Examples are given; however, the Examples are not to be viewed as limiting the scope of the invention, but merely illustrative thereof.

EXAMPLES

In each of the following Examples, photoactive semiconductor titanium dioxide electrodes were produced by painting a coating of electrode material on a 1 cm × 1 cm piece of 5 mil (0.13 mm) thick metal foil. The foil pieces were cleaned and etched in each case by immersing for two minutes in a bath comprising 50 parts by weight water, one part hydrogen peroxide, and one part concentrated hydrofluoric acid. Following immersion in the etching bath, the foil pieces were rinsed free of acid and air dried.

The electrode coating materials detailed in the following Examples are chosen to be representative of those lying within the scope of this invention. The dry electrode coating powders were slurried in sufficient aqueous acetone in each case to produce a mixture of a consistency which could be easily painted on the metal body with a brush. It was found that the amounts of solvent and coating material used in each Example to form the slurry were not critical as long as a slurry of easily spread consistency was obtained.

The coated foil pieces were then heated in air at a temperature between 500° C. and 800° C. for a period of up to eight hours. In all of the following Examples, except Example II, the coated electrodes were further subjected to heating in a hydrogen atmosphere at a temperature between 400° C. and 1000° C. for a period of up to three hours. It is theorized that this reduction step serves to improve the internal electrical conductivity of the electrode coating films, however it is not an absolutely necessary step in the fabrication of electrodes according to the present invention. It is an advantage of electrodes of this invention that such a reduction step is not necessary to produce photoactive properties.

Following the heat treatment steps, fabrication of each electrode was completed by attaching a platinum wire to the coated foil piece. A small region of the electrode coating was removed to reveal the bare metal substrate. A platinum wire was silver epoxy welded to the electrode and the weld joint was covered with silicone rubber.

The photoelectrochemical properties of the electrode prepared in each case were evaluated by measuring the current flow through a cell employing the electrode. The cell in each case consisted of the photoactive electrode, a standard calomel reference electrode, and a platinum counter electrode of 2 $cm^2$ surface area. The electrolyte solution in each Example was 1 normal aqueous sodium chloride solution. Various voltages were impressed across the cell as measured between the experimental electrode and the calomel reference electrode. The current flow between the photoactive electrode and the platinum counter electrode at each voltage was measured. These data appear in the following Table.

The electrical measurements were made while the photoelectrode of each Example was illuminated by light from a 150 watt Model VIX-150 lamp (Eimac Division, Varian Associates, 301 Independence Way, Palo Alto, CA 94070). The light passed through a water-filled tube with quartz endplates to remove infrared wavelengths, and then through a quartz lens to concentrate the light on the photoactive electrode. Measurement indicated that under these conditions, approximately 200 milliwatts of radiant energy of wavelengths less than 400 nanometers were striking the electrode.

EXAMPLE I

A slurry of silver oxide in aqueous acetone was used to paint the surface of a piece of titanium foil. The coated foil was heated in air at 750° C. for eight hours and then in hydrogen gas at 900° C. for three hours. The photoelectrochemical properties of this electrode were determined by the process described above. The current flow generated by this electrode under illumination at various values of applied voltage appear in the accompanying Table.

EXAMPLE II

A slurry of tungstic oxide ($WO_3$) in aqueous acetone was used to paint the surface of a piece of titanium foil. The coated foil was heated in air at 500° C. for eight hours. The photoelectrochemical properties of this electrode were determined by the process detailed above. The current flow generated by this electrode under illumination at various values of applied voltage appear in the accompanying Table.

This electrode was further evaluated by measuring the current flow at various impressed voltages with the light illuminating the electrode having passed through a variable wavelength monochromator. Current flow through the cell was observed with electrode illumination having wavelengths as high as 520 nanometers.

EXAMPLE III

A slurry of tungstic oxide ($WO_3$) in aqueous acetone was used to paint the surface of a piece of titanium foil. The coated foil was heated in air at 500° C. for five hours, and then in hydrogen at 900° C. for three hours. The photoelectrochemical properties of this electrode were determined as detailed above. The current flow generated by this electrode under illumination at various values of applied voltage appear in the accompanying Table.

EXAMPLE IV

A slurry of vanadium pentoxide ($V_2O_5$) in aqueous acetone was used to paint the surface of a piece of titanium foil. The coated foil piece was heated in air at 500° C. for eight hours, and then in hydrogen at 400° C. for three hours. The photoelectrochemical properties of this electrode were determined as detailed above. The current flow generated by this electrode under illumination at various values of applied potential appear in the accompanying Table.

TABLE

| EXAMPLE | ELECTRODE COATING | OPEN CIRCUIT POTENTIAL (VOLTS) | CURRENT FLOW IN MILLIAMPERES AT THE GIVEN POTENTIAL | | | | | | | | | |
|---|---|---|---|---|---|---|---|---|---|---|---|---|
| | | | 0.0V | +0.2V | +0.4V | +0.6V | +0.8V | +1.0V | +1.2V | +1.4V | +1.6V | +1.8V |
| I | $Ag_2O$ on Ti (reduced) | −0.173 | 0.8 | 16.8 | 18.3 | | | | | | | |
| II | $WO_3$ on Ti (unreduced) | −0.302 | | 2.4 | 7.5 | 12.4 | 14.8 | | | | | |
| III | $WO_3$ on Ti (reduced) | −0.361 | | 0.8 | 6.8 | 14.8 | | | | | | |
| IV | $V_2O_5$ on Ti (reduced) | +0.229 | | | | | 0.2 | 0.7 | 1.5 | 2.2 | 3.0 | 3.8 |

The open circuit voltages shown in the accompanying Table are for the electrode and cell system described in each Example above as measured with the experimental electrode under illumination. Examination of the data in the Table shows that the current generated by the illuminated electrode increased in each case with increasing applied potential with comparable current values obtained in Examples II and III where $WO_3$ was used as the preferred oxide modifier in both cases, with one sample further including the reduction step with hydrogen.

While there has been shown and described what is believed at present to constitute the preferred embodiments of the present invention, it will be obvious to those skilled in the art that various changes and modifications may be made therein without departing from the scope of the invention as defined by the appended claims.

What is claimed is:

1. A method of preparing polycrystalline thin film photoactive semiconductor electrodes utilizable in photoassisted oxidation reactions comprising sequentially the steps of:

providing a suspension of finely divided modifying oxide in a volatile solvent wherein the modifying oxide comprises at least one oxide of a metal selected from the group consisting of the d-electron transition metals excluding titanium, the metal exhibiting an oxidation state other than +4 in the oxide, applying the suspension of modifying oxide to the surface of a titanium metal body to form a thin film of the modifying oxide thereon, and heating the coated titanium metal body in an oxygen-containing atmosphere at an elevated temperature below about 800° C., for a period of time sufficient to form an adherent layer of titanium dioxide on the surface of the titanium body, whereby the titanium dioxide contains the modifying oxide in a uniform concentration gradient having a minimum at the titanium body surface and a maximum at the surface of said layer of titanium dioxide.

2. The method of claim 1 wherein said modifying oxide is selected from the group consisting of cobalt oxide, lanthanum oxide, molybdenum oxide, silver oxide, tungstic oxide, vanadium pentoxide, and mixtures thereof.

3. The method of claim 2 wherein said electrode coating material is $WO_3$.

4. The method of claim 2 wherein said coated titanium body is heated in an oxygen-containing atmosphere at a temperature of from about 500° C. to about 800° C. for a period of from one-quarter hour to eight hours.

5. The method of claim 4 wherein said oxygen-containing atmosphere is air.

* * * * *